United States Patent [19]
Steele et al.

[11] 3,956,241
[45] May 11, 1976

[54] LATENT CATALYSTS FOR EPOXY RESINS
[75] Inventors: Roger Beresford Steele, Fair Oaks; Arthur Katzakian, Jr., Sacramento; Herman H. Weyland, Morgan Hill, all of Calif.
[73] Assignee: Aerojet-General Corporation, El Monte, Calif.
[22] Filed: June 7, 1974
[21] Appl. No.: 477,377

[52] U.S. Cl............................ 260/47 EC; 260/2 N; 260/2 EA; 260/2 EC; 260/47 EA; 260/47 EN; 260/59 EP; 260/79.3 R; 526/90
[51] Int. Cl.$^2$................. C08G 59/42; C08G 59/44; C08G 59/68
[58] Field of Search .......... 260/2 BP, 2 EC, 47 EC, 260/47 EN, 78.4 EP, 326 A, 78 TF

[56] References Cited
UNITED STATES PATENTS

| | | | |
|---|---|---|---|
| 3,624,032 | 11/1971 | Miyashiro et al. | 260/47 EC |
| 3,635,869 | 1/1972 | Steele et al. | 260/30.4 EP |
| 3,812,214 | 5/1974 | Markovitz | 260/830 TW |
| 3,819,746 | 6/1974 | Katzakian et al. | 260/830 TW |
| 3,838,101 | 9/1974 | Steele | 260/47 EN |

*Primary Examiner*—Donald E. Czaja
*Assistant Examiner*—E. A. Nielsen
*Attorney, Agent, or Firm*—Marvin E. Jacobs

[57] ABSTRACT

Mobile mixtures of an oxirane compound and a labile hydrogen compound such as an acid, anhydride, imide or sulfonimide can be stored at long periods of time under ambient conditions in the presence of a latent chromium III chelate. At an elevated temperature, the catalyst is activated and rapidly converts the mixture into a more advanced state of cure.

7 Claims, No Drawings

LATENT CATALYSTS FOR EPOXY RESINS

BACKGROUND OF THE INVENTION

1. Field of the Invention

This invention relates to resins and, more particularly, to ambient, temperature-stable mixtures of epoxy-labile hydrogen monomers and a latent catalyst.

2. Description of the Prior Art

Currently available epoxy-resin formulations are marketed as two component systems, the resin and curing agent. The packaging and utilization of these two-part epoxides present the disadvantages of package bulkiness and resin property variations due to improper proportioning and mixing. Substantial effort has been and is now being directed towards new packaging, metering and mixing techniques designed to alleviate these problems. Premixed, one-component systems containing the resin and cure catalyst circumvent these difficulties. However, in most cases the pot life of the catalyzed resin is impractically short; that is, on the order of minutes at room temperature.

Recently it has been discovered that polymers can be produced by the reaction of imides, acids or anhydrides with polyepoxides in the presence of chromium II salts having unoccupied coordination sites. The reaction appears to proceed rapidly at temperatures from 100°C to 150°C (as opposed to about 300°C for other approaches), and does not produce water or any other by-products. At the present time, most polyimide compositions are sold as polyamic acid solutions. Solvent must be removed prior to use and volatiles are removed during cure.

Since no by-products are evolved, these polymers are amenable to standard bag molding techniques for preparing fiber reinforced structures, thus reducing fabrication costs and rendering the polymers useful in the fabrication of large structures. The polyimides are also useful as adhesives since the absence of by-products eliminates the need for high pressures for bonding and are also useful as heat-set potting compounds for encapsulation of electrical components. The polyesters will also find use as films for wire wrapping, motor insulation, surface coatings, lacquers, textile fibers, molding resins, fiberglass laminates for use in aircraft parts, honeycombs, forms as well as intermediates for producing other chemical compounds.

The chromium III salt catalysts provide rapid cure of these epoxy systems even at ambient temperature. However, the pot life is extremely limited and requires separate packaging and metering and mixing very near in time to fabrication.

SUMMARY OF THE INVENTION

The present invention provides a stable, mobile mixture of a labile hydrogen compound, an oxirane compound and an inactive latent chromium III chelate. The mixture is storable for prolonged periods of time at ambient temperatures with no apparent increase in viscosity. When the mixture is heated to an elevated temperature sufficient to activate the catalyst, for example, from 50°C to 250°C, preferably 150°C to 200°C, the catalyst rapidly polymerizes the mixtures into a more advanced state. The present invention can thus provide a solventless, storable, one-package resin which cures without the evolution of volatile material.

An important characteristic of chromium chemistry comprises the fact that chromium III possesses six primary coordination or bonding sites arranged in an octahedral configuration. Support for this view comes from the observation of complex ions, such as the chromium III hexaaquo-ion $Cr(H_2O)_6^{+++}$, in which all of the available coordination sites are occupied. Similarly, the six coordination sites of chromium III chelates, such as chromium acetylacetonate, are occupied by the difunctional acetylacetonate anions, as shown below:

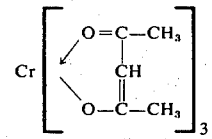

However, in the case of anhydrous chromium tricarboxylate salts, such as chromium tri-2-ethylhexanoate (COT), only three of the six coordination sites are occupied. The effectiveness of anhydrous chromium tricarboxylates in promoting the epoxy-labile hydrogen reaction has been related to the fact that unoccupied coordination sites on these chromium salts are available to particiate in catalysis.

It has now been discovered that chelated chromium III compounds may be stored for long periods of time in epoxy-labile hydrogen system without causing cure. Heating the catalyst composition causes destruction of the chelate and frees the catalytically active form of chromium III; cure follows shortly thereafter. The critical aspect of this storable catalyst-resin system, then, is the blocking of the crucial coordination sites on chromium III by chelation.

The activation temperature or temperature at which the passivated, latent chromium III chelate is destroyed depends on the characteristics of the particular chelating agent. Various ligands may be utilized to form the chelate. It is preferred that ligands such as diethylenetriamine be avoided since such ligands form very strong complexes requiring activation temperatures of over 300°C to liberate the active catalyst.

Preferred passivated chromium III catalysts which are inactive at temperatures below 50°C and are rendered very active at temperatures from 50°C to 200°C are chelates of β-dicarbonyl compounds such as diketones, dialdehydes, aldehyde-ketones, diesters or diamides which contain the essential partial structure:

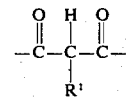

where $R^1$ may be hydrogen, alkyl preferably containing 1–10 carbon atoms such as methyl, aryl such as phenyl, cycloalkyl, or hydroxy, halo, nitro or cyano derivatives thereof. Exemplary alkyl or aryl substituted with non-interfering groups are $F_3C-$ are nitrophenyl.

The ligand for the chelate may have the general formula:

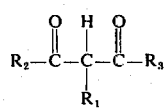

$R_1$ is as defined before, wherein $R_2$ and $R_1$ are selected from $R_1$, halo, $NR^1$, $-OR^1$ or $R_2$ and $R_3$ taken together represent a saturated or unsaturated chain of hydrocarbon atoms preferably containing not more than 10 carbon atoms. The diketones eliminate the alpha hydrogen to form negative ligand containing chelates of the formula:

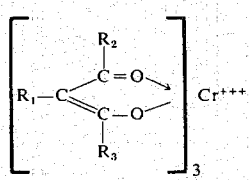

Representative β-dicarbonyl compounds and Cr III chelates are listed in the following table:

Table 1

| β-diketone | Catalyst |
| --- | --- |
| Acetylacetone | Tris-(acetylacetonato)-Chromium (III) |
| 2-acetylhexanone | Tris-(2-acetylcyclohexanato)-Chromium (III) |
| 1,3-diphenyl-1,3-propane dione | Tris-(1,3-diphenyl-1,3-propanedionato) Chromium (III) |
| 1-phenyl-1,3-butanedione | Tris-(1-phenyl-1,3-butanedione) Chromium (III) |
| 1,3-diphenyl-1,3-pentanedione | Tris-(1,3-diphenyl-1,3-pentanedionato) Chromium (III) |
| Picolinic acid | Tris (picolinato) Chromium (III) |
| Dibenzoyl methane | Tris (dibenzoyl methane) Chromium (III) |

The epoxide-containing compositions capable of using our novel catalyst comprise organic materials having reactive 1,2-epoxy groups. These polyepoxide materials can be monomeric or polymeric, saturated or unsaturated, aliphatic, cycloaliphatic, aromatic or heterocyclic, and they may be substituted if desired with other substituents besides the epoxy groups, e.g. hydroxyl groups, ether radicals, halogen atoms, and the like.

The oxiranes which may be used in the practice of this invention include any of those materials familiar to those skilled in the art. Typical epoxy components suitable in the practice of the present invention are those disclosed in U.S. Pat. No. 2,500,600 and 2,324,483, the disclosures of which are expressly incorporated herein by reference.

As 1:2-epoxy compounds to be used in the present invention there may be used monoepoxides, such as butylglycide, phenylglycide, cresylglycide, 3:4-epoxy-tetra-hydrodicyclopentadienol - 8, 3:4 -epoxy-hexahydrobenzal glycerol or 3:4-epoxy-cyclohexane-1:1-dimethanol-acrolein acetal. Preferred use is made of 1:2-epoxy compounds having an epoxide equivalence greater than 1, that is to say compounds containing x groups of the formula

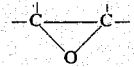

calculated from the average molecular weight, where x is a whole or fractional number greater than 1.

The 1:2-epoxide groups may be either terminal or inner ones. Particularly suitable terminal 1:2-epoxide groups are 1:2-epoxyethyl or 1:2-epoxypropyl groups; the later may be linked to an oxygen atom, that is to say they are glycidylether or glycidylester groups. Compounds with inner epoxide groups contain at least one 1:2-epoxide group in an aliphatic chain

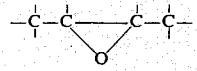

or in a cycloaliphatic ring.

As epoxy compounds containing an inner 1:2-epoxide group there are suitable expoxidized diolefins, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized, diolefinically unsaturated carboxylic acid esters, such as methyl-9:10:12:13-diepoxystearate; or the dimethyl ester of 6:7:10:11-diepoxyhexadecane-1:16-dicarboxylic acid. Furthermore, there may be mentioned epoxidized mono-, di- or poly-ethers, mono-, di or poly-esters, mono-, di- or poly-acetals containing at least one cycloaliphatic 5-membered or 6-membered ring, to which at least one 1:2-epoxide group is linked. Suitable compounds of this kind are those of the following formulae

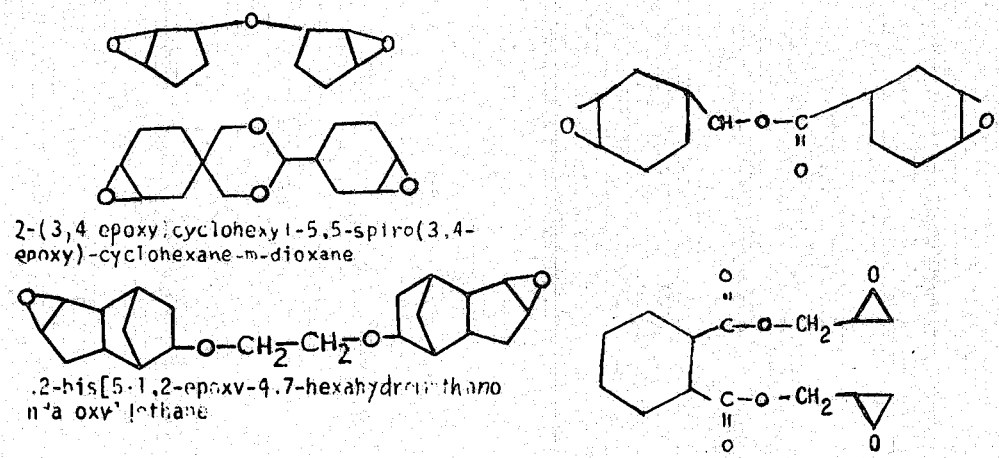

2-(3,4 epoxy cyclohexyl-5,5-spiro(3,4-epoxy)-cyclohexane-m-dioxane

.2-bis[5-1,2-epoxy-4,7-hexahydromethano n-a oxy]ethane

A widely used class of polyepoxides which can be catalyzed in reaction with anhydrides according to the practice of the present invention encompasses the epoxy polyethers obtained by reacting a halogen containing epoxide or dihalohydrin, such as epichlorohydrin, epibromohydrin, 3-chloro-1,2, epoxyoctane, and the like with either a polyhydric phenol or a polyhydric alcohol.

Among the polyhydric phenols which can be used in preparing these resinous epoxy polyethers are dihydric phenols represented by the general formula:

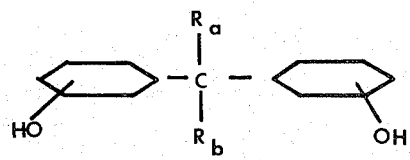

wherein the phenolic hydroxy groups may be in one of the 2,2'; 2,3'; 2,4'; 3,3'; 3,4'; or 4,4' positions on the aromatic nuclei, and each of $R_a$ and $R_b$ represent hydrogen, an alkyl group, such as methyl, ethyl, propyl, isopropyl, butyl, sec-butyl, tert.-butyl, pentyl, isopentyl, hexyl, isohexyl, and the like; a cyclo (lower)-alkyl group, such as a cyclohexyl or substituted cyclohexyl group, e.g., methyl-, ethyl-, propyl-, butyl-, pentyl- and hexyl-substituted cyclohyxyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, secbutyl and tert. butyl groups, halogen atoms, i.e., fluorine, chlorine, bromine or iodine, and the like.

An illustrative listing of dihydric phenols falling within this general formula includes 4,4'-dihydroxydiphenyldimethylmethane (bisphenol A), 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane, 4,4-dihydroxydiphenylmethane (bisphenol F), and the like.

Other polyhydric phenols which may also be coreacted with halohydrins to provide these epoxy polyethers are such compounds as resorcinol, hydroquinone substituted hydroquinones and polyhydric phenols having two hydroxylaryl groups separated by an aliphatic chain of at least six carbon atoms in length, said chain being attached by carbon-to-carbon bonding to nucler carbon atoms of the hydroxylaryl groups. Members of this latter class of polyhydric phenols can be conveniently obtained by condensing phenol substituted with an aliphatic side chain having one or more olefinic double bonds positioned therein, thus providing the required number of separating atoms between the two hydroxyphenyl groups of the resulting polyhydric phenol. Cardanol, obtainable in known manner from cashew nut shell liquid, is a convenient source of phenols containing such side chains.

The monomer products produced by this method from dihydric phenols and epichlorohydrin may be represented by the general formula, e.g.,

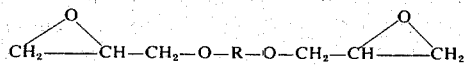

wherein R represents a divalent hydrocarbon radical of the dihydric phenol alcohol. The polymeric products will generally not be a single simple molecule but will be a complex mixture of glycidyl polyethers of the general formula:

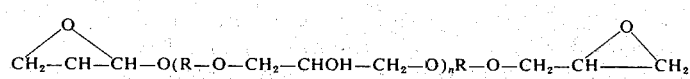

wherein R is a divalent hydrocarbon radical of the dihydric phenol and n is an integer of the series 0, 1, 2, 3, etc. While for any single molecule of the polyether n is an integer, the fact that the obtained polyether is a mixture of compounds causes the determined value for n to be an average which is not necessarily zero or a whole number. The polyethers may in some cases contain a very small amount of material with one or both of the terminal glycidyl radicals is hydrated form.

The aforedescribed preferred glycidyl polyethers of the dihydric phenols may be prepared by reacting the required proportions of the dihydric phenol and the epichlorohydrin in an alkaline medium, as per U.S. Pat. No. 2,768,153.

Among the polyhydric alcohols which can be coreacted with a halogenated oxirane, such as epihalohydrin to provide these epoxy polyethers are such compounds as ethylene glycol, propylene glycols, butylene glycols, pentane diols, bis(4-hydroxycyclohexyl) dimethylmethane, 1,4-dimethylolbenzene, glycerol, 1,2,6-hexanetriol, trimethylol propane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyvinyl alcohol, polyhydric thioethers such as 2,2'-dihydroxydiethyl sulfide, 2'2', 3,3'-tetrahydroxydipropyl sulfide and the like, mercapto alcohols such as a-monothioglycerol, a,a'-dithioglycerol, and the like, polyhydric alcohol partial esters such as monostearin, pentaerythritol monoacetate and the like, and halogenated polyhydric alcohols such as the monochlorohydrins of glycerol, sorbitol, pentaerythritol and the like.

The resulting reaction products may contain free terminal carboxyl groups or terminal hydroxyl groups and terminal epoxy groups, and will vary in molecular weight depending on the reactants employed, the relative amounts thereof, and the extent to which the reaction is carried out.

Another class of polymeric polyepoxides utilizeable herein, includes the epoxy novolac resins obtained by reacting, preferably in the presence of a basic catalyst, e.g., sodium or potassium hydroxide, epihalohydrin such as epichlorohydrin with the resinous condensate of an aldehyde, e.g., formaldehyde, and a monohydric aromatic alcohol, such as phenol, cresol, etc.

It is to be seen that the number of oxirane compounds suitable for use in this reaction with carboxylic acids in the presence of the catalyst compositions forming part of this invention is quite large. Some of these have been recited above, others will be recited below. In any event those not specifically recited, but which are utilizeable are set forth in "Epoxy Resins, Chemistry and Technology", May and Tanaka, c 1973 Marcel Dekker, Inc., at Chapter 2 pages 9 to 106 inclusive; "*Handbook of Epoxy Resins,*" Lee and Neville, c 1967 McGraw-Hill, Inc., at Appendix 4—1 and 4—2. Still other nonenumerated types of oxiranes are recited in U.S. Pat. Nos. 3,296,208; 3,449,353, 3,542,803; 3,629,263, 3,676,456, 3,679,681, 3,697,539, 3,714,198, 3,772,326, 3,779,949, 3,784,525, and 3,784,584. These book sections and the disclosures of these patents are herein incorporated by reference.

Still another class of polymeric polyepoxides includes polymers, i.e., homopolymers and copolymers, of epoxy-containing monomers which also contain at least one polymerizable double bond. Such monomers can be polymerized through their double bonds in known manner, e.g., in bulk or in solution in an inert organic solvent such as benzene and the like, preferably by heating in the presence of oxygen or a peroxide catalyst but, in the absence of alkaline or acidic catalysts, leaving the epoxy groups unaffected and, therefore, regularly or randomly dispersed along the polymer chains. Among such ethylenically unsaturated epoxy-containing monomers are vinyl 2,3-glycidyl ether, allyl 2,3-glycidyl ether, methallyl 2,3-glycidyl ether, methallyl 3,4-epoxybutyl ether, glycidyl acrylate, glycidyl methacrylate, 2,3-epoxypropyl crotonate, vinyl cyclohexane monoxide, 4-glycidyloxystyrene and the like. Another group of polyepoxides include the epoxy esters of polybasic acids such a diglycidyl phthalate and diglycidyl adipate, diglycidyl tetrahydrophthalate, diglycidyl maleate, epoxidized dimethallyl phthalate and epoxidized dicrotyl phthalate Among the monomeric polyepoxides which can be reacted with anhydrides per the present invention are the di- and triepoxides represented by the general formula:

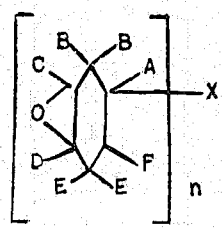

wherein A through F represent hydrogen or an alkyl group preferably a lower alkyl group having from 1 to 4 carbon atoms inclusive, such as an ethyl, ethyl-propyl, n-butyl and the like, and x represents a divalent radical which can be:

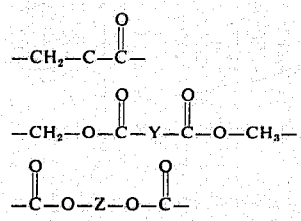

in which case n equals 2, or a trivalent radical which can be

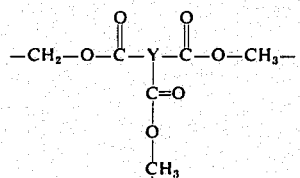

or

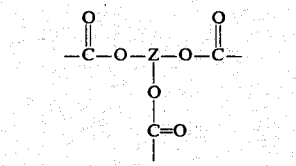

in which case n equals 3, with Y representing an aliphatic or aromatic hydrocarbon radical containing from 2 to 12 carbon atoms, inclusive, and Z representing a lower aliphatic hydrocarbon radical or a lower oxyalkylene group, e.g., alkylene-O-alkylene- and the like. Included among such di- and triepoxides are 3,4-epoxycyclohexylmethyl (3,4-epoxy)-cyclohexanecarboxylate; 3,4-epoxy-6-methylcyclohexylmethyl, (3,4-epoxy)-6-methylcyclohexanecarboxylate; bis (3,4-epoxycyclohexylmethyl) maleate, bis (3,4-epoxy-6-methylcyclohexylmethyl)-succinate, ethylene glycol bis (3,4-epoxycyclohexanecarboxylate), 2-ethyl-1,3-hexanediol bis (3,4-epoxy-6-methylcyclohexanecarboxylate), tris (3,4-epoxycyclohexylmethyl) 1,2,4-hexanetricarboxylate, glyceryl tris (3,4-epoxy-6-methylcyclohexanecarboxylate) and the like.

Other monomeric polyepoxides which can be used include dicyclopentadiene dioxide, epoxidized triglycerides such as epoxidized glycerol trioleate, epoxidized glycerol trilinoleate, the diacetate of epoxidized glycerol trilinoleate and the like, 1,8-bis-(2,3-epoxypropoxy) octane; 1,4-bis(2,3-epoxypropoxy) cyclohexane; 1,4-bis (3,4-epoxybutoxy)-2-chlorocyclohexane; 1,3-bis ( 2,3-epoxypropoxy) benzene; 1,4-bis (2,3-epoxypropoxy) benzene; 1,3-bis (2-hydroxy-3,4-epoxybutoxy) benzene; 1,4-bis (2-hydroxy-4,5-epoxypentoxy) benzene; 1,3-bis (4,5-epoxypentoxy)-5-chlorobenzene; 4,4'-bis (2,3-epoxypropoxy) diphenyl ether; and epoxy esters of polybasic acids such as diglycidyl succinate, diglycidyl adipate, diglycidyl maleate, digycidyl phthalate, diglycidyl hexachloroendomethylenetetrahydrophthalate and diglycidyl 4,4'-isopropylidenedibenzoate, and the like.

Furthermore, there are suitable polyglycidylesters accessible by reacting a dicarboxylic acid with epichlorohydrin or dichlorohydrin in the presence of an alkali;

such polyesters may be derived from aliphatic dicarboxylic acids, such as oxalic, succinic, glutaric, adipic, pimelic, suberic, azelaic, sebacic acid, or more especially from aromatic dicarboxylic acids, such as phthalic, isophthalic, diphenylortho: ortho'-dicarboxylic acid, ethyleneglycol-bis-(paracarboxyphenyl)-ether or the like. As examples there may be mentioned diglycidyl adipate and diglycidyl phthalate.

Many of these polepoxides, and particularly those which are polymeric can be conveniently referred to in terms of epoxy functionality, i.e., the average number of epoxy groups per molecule in the polyepoxide material. Where the polyepoxide is monomeric and all of its epoxy groups are intact, its epoxy functionality will be represented by an integer, usually 2 or greater. However, where the polyepoxide is polymeric its epoxy functionality will usually be represented by a fractional value of at least about 1.0 or greater, e.g., 1.5, 1.8, 2.3, and the like, since the polymer will usually contain molecules of different molecular weight and can also contain some monomeric polyepoxide or have some of its epoxy groups dehydrated or otherwise reacted.

Flame-inhibiting properties in the final product may be achieved by using 1.2-epoxy compounds that additionally contain halogen, more especially chlorine or bromine. The following examples of such halogen-containing epoxy compounds may be mentioned.

Diglycidylethers of chlorinated bisphenols, 2:3-dichloro-1:4 butanediol diglycidylether, 2:3-dibromo-1:4-butanediol diglycidyl ether, 2:2, 3:3-tetrachloro-1:4-butanediol digylcidylether.

The imide may be mono-, or poly-functional and may be a low molecular weight monomeric material or an intermediate molecular weight liquid prepolymeric material, suitably having a molecular weight from 1,000 to 5,000. Exemplary mono-imides are succinimide, tetrahydrophthalimide, maleimide, phthalimide, hexahydrophthalimide, glutarimide or benzene sulfonimide.

Polyfunctional imides include linear or cyclic, saturated or unsaturated aliphatic or aromatic compounds such as barbituric acid, cyclopentane diimide, pyromellitic diimide, benzophenonediimide, diphenyletherdiimide, adipimide, terephthaldiimide or bis (3,4-dicarboxyphenyl) ether diimide. Compounds such as 4 carboxyphthalamide can be reacted with aliphatic diamines to produce amidimides which in turn are reacted with diepoxides to produce polyamideimides.

Imide terminated resins can be prepared by the reaction of diimides with isocyanate terminated resins such as butadiene terminated with isocyanate or by polymeric reaction with isocyanate materials such as toluene diisocyanate (TDI). Imide terminated resins can also be prepared by reaction of diimides with polyfunctional acids such as dimer or trimer acid.

Carboxylic acids utilizeable herein may be monofunctional as well as di- and polyfunctional. They may also be saturated or unsaturated, aliphatic, aromatic, heterocyclic, monomeric and polymeric in nature. They may also contain non-interfering groups other than carboxylic acid as substituents on the organic backbone. Typical of the monofunctional acids are acetic, formic, 2-ethyl hexanoic, octanoic, salicyclic, dodecanoic, oleic, 2-methoxy proprioni toluic, ascorbic, linoleic, linolenic, acrylic, methacrylic, benzoic, naphthoic, chloroacetic, lactic, ricinoleic, stearic, benzylic, butyric, cyclohexane carboxylic, picolinic, furane carboxylic, acids.

Polyfunctional monomeric acids utilizeable include citric acid, citraconic acid, maleic acid, itoaconic acid, oxalic acid, malonic acid, succinic acid, glutaric acid, adipic acid, pimelic acid, azelaic acid, sebacic acid, brassylic acid, trimellitic acid, trimesic acid, phthalic acid, isophthalic acid, o, m and p, dicarboxy benzophenones, 1,2- or 1,3- or 1,4- or 1,5- or 1,6- or 1,7- or 1,8- or 2,3- or 2,7- or 2,8- naphthalene dicarboxylic acids, dimer fatty acid, trimer fatty acid and polyester acids.

Mention should also be made of polyfunctional polymeric acids, these include carboxy functional polyesters, carboxy terminated polyolefins, e.g. polybutadiene, carboxy terminated polyethers such as the succinic acid half ester of polyether glycols, dimerized and trimerized fatty acids.

In reaction with a mono acid such as acetic, acrylic, propionic, benzoic, chloroacetic, lactic and the like, there may be employed in addition to the recited monoepoxides, such polyfunctional oxiranes as the diglycidyl ether of bisphenol A, cyclopentadiene dioxide, resorcinol diglycidyl ether, 1,2,4,5, diepoxycyclohexane, and butanediol diglycidylether. It is seen that all of the above reactions give rise to nonpolymeric adducts which contain beta hydroxy ester linkages.

In the practice of the invention, the latent trivalent chromium compound is used in an effective catalytic amount, of from about 0.1% to about 10% based on the total weight of the three key components, namely the oxirane, acid, and catalyst. Thus, if a 1% level is desired, 99 grams of a mixture of the oxirane and acid components would be utilized with 1 gram of catalyst.

If other miscible or soluble ingredients are added to the system, the catalyst level must be based upon the total weight in grams of the solution phase. Thus if a plasticizer is added to the 99 grams of reactants, and is present in the weight of 49.5 grams, the catalyst level need be set at 1.5 grams to maintain a catalyst concentration of 1% if it is desired to maintain comparable reaction rates to the above reaction without plasticizer. If inert insoluble materials such as carbon black, silica gel, $CaCO_2$ and the like are added to the system, their weight is not to be taken into consideration in calculating the catalyst level.

The acid anhydrides used as the curing agent in the process of the invention may be any anhydride derived from a carboxylic acid which possesses at least one anhydride group, i.e., a

The carboxylic acids used in the formation of the anhydrides may be saturated, unsaturated, aliphatic, cycloaliphatic, arematic or heterocyclic. Examples of these anhydrides include, among others, phthalic anhydride, isophthalic anhydride, di-, tetra- and hexahydrophthalic anhydride, 1, 3, 5, 6, 7, 7 - hexachloro - 3,6 - endomethylene 1,2,3,6 tetrahydrophthalic anhydride (chlorendic anhydride), succinic anhydride, maleic anhydride, chlorosuccinic anhydride, monochloromaleic anhydride, 6-ethyl-, 4-cyclohexadiene, 1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccnic acid anhydride, dioctyl succinic anhydride, nonadecadienylsuccinic anhydride, 3-methoxy-1,2,3,6- tetrahydrophthalic acid anhydride, 3-butoxy-1,2,3,6-tetrahydrophthalic anhydride, pyromellitic anhydride, di-, tetra- and hexahydropyromellitic anhydride, polyadipic acid anhydride, polysebacic acid anhydride, and the like and mixtures thereof.

Preferred anhydrides to be employed in the process comprises the aromatic mono- and dianhydrides (i.e., those processing two of the above-noted anhydride groups such as pyromellitic anhydride), aliphatic and cycloaliphatic monoanhydrides, and the chlorinated derivatives of the aforedescribed mono- and dianhydrides. Especially preferred are the normally liquid or low melting anhydrides.

Other suitable agents include the trimellitic anhydride adducts of the general formula:

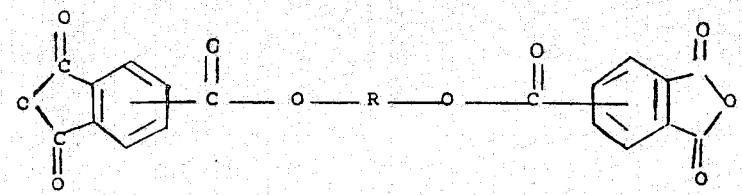

wherein R is a hydrocarbon radical, preferably having from 2 to 12 carbon atoms, and wherein the aromatic nuclei may be substituted with one or more halogen atoms and/or one or more hydrocarbyl groups. Very suitable adducts are the trimellitic anhydride-polyhydric alcohol adducts, preferably an adduct of a glycol such as ethylene glycol, and especially

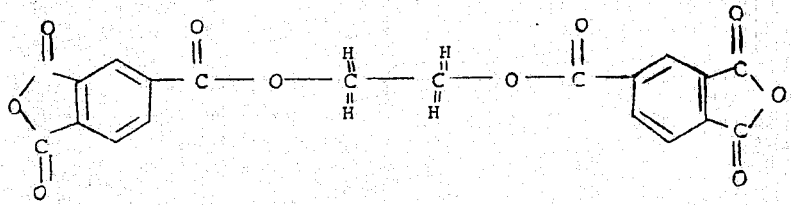

Still other suitable agents include the benzophenone tetracarboxylic diahydrides of the formula:

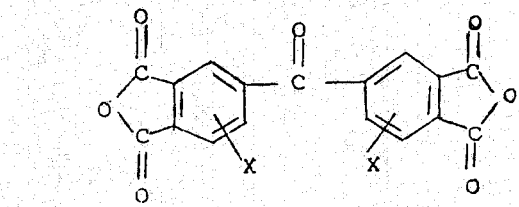

wherein X represents hydrogen, halogen, —NO —COOH, —SO₃H or —NH₂ and may be the same or different radical.

Representative benzophenone tetracarboxylic dianhydrides include, among others, 3,3',4,4'-benzophenone tetracarboxylic dianhydride; 2-bromo-3,3',4,4'-benzophenone tetracarboxylic dianhydride; and 5-nitro-3,3',4,4'-benzophenone tetracarboxylic dianhydride.

Other well known anhydrides that are utilizeable here are the polyfunctional cyclic anhydrides. Among these, mention may be made of pyromellitic tetracarboxylic acid dianhydride, cyclopentane tetracarboxylic acid dianhydride, diphenylether tetracarboxylic acid dianhydride, and the hexacarboxylic acid trianhydrides of benzene, and of cyclohexane.

Other useful anhydrides include the linear of cyclic anhydrides of any of the following acids; oxalic acid, malonic acid, glutaric acid, adipic acid, pimelic acid, azelaic acid, sebacic acid, brassylic acid, trimellitic acid, dimer fatty acid, trimer fatty acid and the polyester acid, such as the diacid from an excess of azelaic acid and neopentyl glycol sold under the tradename "Emery Diacid", by Emery Chemical Company and having an equivalent weight of 500.

As will be apparent to those skilled in the art, the ratio of oxirane to organic polybasic acid anhydride may be varied over a wide range, depending upon the functionality of the reactants and the properties desired in the final cured product. Normally, for a tough, hard product, at least one of the two coreactants should have a functionality greater than one.

It is preferred that a compound capable of polarizing the carboxylic acid anhydride to yield a reactive carboxylic acid moiety be present as a cocatalyst. The cocatalyst acts to open up the anhydride ring to form an acid moiety and the acid moiety then reacts with the oxirane compound in the presence of the latent chromium III compound. However, nonpolarizing-anhydride reactive compounds, such as an alcohol or water can be utilized to sever the anhydride ring without polarization.

Among the cocatalysts that can be utilized herein are the fully substituted compounds of the following types:

1. Quaternary Ammonium Hydroxides and halides of the formulae:

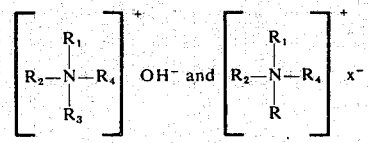

wherein $x$ = F, Br, Cl, I.

2. Quaternary Phosphonium halides of the formula:

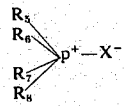

3. Arsines of the formula:

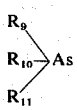

4. Amine oxides of the formula:

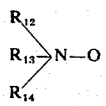

5. Aminophenols of the formula:

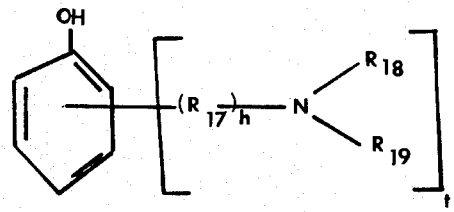

$t = 1, 2$ or $3$.

6. Phosphine Oxides of the formula:

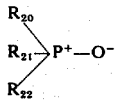

7. Phosphines of the formula:

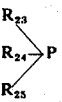

8. Amines of the formulae:

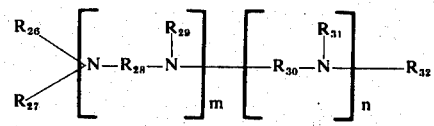

$m = 0$ or $1$, $n = 0$ or $1$, and if $m = o$, $n = o$

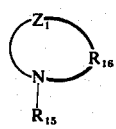

and

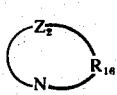

wherein $Z_1$ and $Z_2$ each represent the remaining atoms necessary to complete a heterocyclic ring nucleus, wherein $Z_1$ contains carbon atoms and any of nitrogen, oxygen and phosphorous atoms, said $Z_1$ heterocyclic nucleus being selected from the group consisting of pyrrolyl, imidazolyl, pyrazolyl, isoindolyl, indolyl, indazolyl, purinyl, carbazolyl, B carbolinyl, pyrrolidnyl, pyrrolinyl, phentothiazinyl, perinidinyl, phenoxazinyl, imidazolidinyl, imidazolinyl, pyrazolidinyl, pyrazolinyl, isoindolinyl, quinuclindinyl, morpholinyl, phosphoromorpholinyl, piperidyl, piperazinyl, indolinyl, and said $Z_2$ heterocyclic nucleus being selected from the group consisting of pyridyl, pyrazinyl, pyrimidinyl, pyridazinyl, indolizinyl, cinnolinyl, pteridinyl, phenanthridinyl, acridinyl, phenanthrolinyl, isoxazolyl, furazanyl, and benzoisoquinolinyl.

$R_{15}$ is an alkyl or haloalkyl group of from 1 to 6 carbon atoms.

$R_{16}$ represents the nonreactive substituents attached to all of the atoms of the heterocyclic nucleus formed from Z and the N atom attached thereto.

wherein $R_1$ through $R_{14}$, $R_{20}$ through $R_{27}$, $R_{29}$, $R_{31}$ and $R_{32}$ may be any of the same or different alkyl [$C_1$ to $C_{12}$], cycloalkyl of 4 to 7 carbon atoms in the ring, aryl, aralkyl wherein the alkyl portion is $C_1$ to $C_6$, alkyaryl wherein the alkyl portion is $C_1$ to $C_6$, and $C_1$ to $C_6$ refers to the number of carbon atoms;

further, wherein $R_{17}$ is an alkyl group of 1 to 2 carbon atoms and h is a number of 1 or 0. $R_{18}$ and $R_{19}$ are alkyl groups of 1 to 6 carbon atoms, $R_{28}$ and $R_{30}$, $R_{15}$ and $R_{16}$ are each alkyl groups of 2 to 6 carbon atoms, Any and all of the R groups $R_1$ to $R_{32}$ may contain one or more Z substituents thereupon wherein said Z substituents are groups that are noninterferring with the catalytic activity and non-reactive with the chromium catalyst, the anhydride, the oxirane compound or the cocatalyst or acceleration of present and said Z substituents are free from labile hydrogen. By labile hydrogen we mean the hydrogens in such groups as hydroxyl, carboxyl, primary and secondary amine and thio. Although a sole co-catalyst may be effective, combinations of two or co-catalysts can be used and may be preferred in conjunction with the chromium compounds.

Furthermore, each cocatalyst or combinations thereof when used in conjunction with the chromium compounds, can have a reactive promoter employed as a third class of component for the catalytic composition. Such reactive promoters include the phenols of the formula:

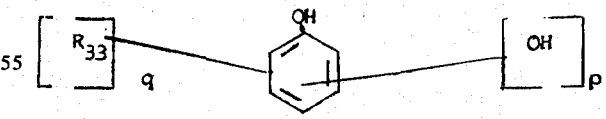

wherein $R_{33}$ represents all of the organic carbon chains that can replace the aromatic protons on the aryl ring, and can be the same or different alkyl, aryl, alkaryl, and aralkyl groups with a total carbon atom content of all the R groups constituting $R_{33}$ being up to 15 carbon atoms, and wherein the aromatic protons which are not replaced by $R_{33}$ or OH groups are H.

and p is a number of 1 or 0 and q is a number of 0 to 5, the sum of p and q being no more than 5.

These R groups other than $R_{17}$, $R_{18}$, $R_{19}$, $R_{28}$ and $R_{30}$, may be straight sum branched chain saturated or unsaturated including ethylenic and acetylenic unsaturation. Exemplifying such groups are methyl, ethyl, n-propyl, isopropyl, n-butyl, isobutyl, sec-butyl, tert-butyl, amyl, hexyl, octyl, decyl, dodecyl, hexadecyl, octadecyl, propenyl, allyl, butenyl, propargyl, octadecenyl, cyclopentyl, cyclohexyl, cyclohexenyl, phenyl, totyl, xylyl, ethylphenyl, styryl and dodecylphenyl, chlorophenyl, cyanoethyl, phenoxyphenyl, tertiary amido, e.g., N-diethylethyl, dibutyl, dipropyl, and the like.

Other reactive promoters include monocarboxylic acids and monoalcohols of the formulae $R_{34}OH$ and $R_{35}COOH$ wherein $R_{34}$ and $R_{35}$ are aliphatic hydrocarbon groups of 1 to 9 carbon atoms.

Compounds which include two or more of the cocatalytic functional groups or which combine cocatalyst and promoter groups include:

9. Phosphoramides:

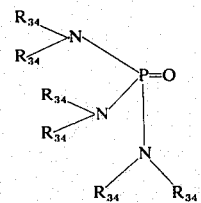

10. Phosphineamines:

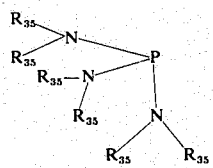

11. Tertiary Amino Phenols: See type (5) above. wherein $R_{34}$ and $R_{35}$ are alkyl and haloalkyl groups of 1 to 6 carbon atoms; and others all of which have dual cocatalyst functionality.

Among the quaternary ammonium hydroxides and halides of Group (1) utilizeable herein mention may be made of benzyltrimethylammonium hydroxide and halides; benzyltriethylammonium hydroxide and halides; tetramethylammonium, hydroxide or halides diphenyldimethylammonium, hydroxide and halides; tetraethyl ammonium hydroxide and its corresponding halides. Typical phosphonium halides of Group (2) include triiodidecylphosphonium chloride, and tridecylphosphonium bromide.

Arsines suitable as catalyts include but are not limited to: trimethyl phosphine, tricylohexyl arsine, triphenyl arsine, trioctyl arsine, diphenyl butyl arsine, trixylyl arsine, tridecyl arsine, dicyclohexyl arsine, and tricyclohexen yl arsine, triphenyl phosphine, diphenyl cyclohexyl phosphine, tributyl phosphine, trixylyl phosphine, tridodecyl phosphine, cyclohexyl octyl phosphine and the like. Particularly preferred arsines include the trialkyl, tricycloalkyl tri(alkylcycloalkyl), triaryl and trialkaryl arsines and particularly those wherein each alkyl, cycloalkyl, alkcycloalkyl and aryl and alkaryl radicals contain no more than 12 carbon atoms and preferably are not more than 9 carbon atoms.

Among the amine oxides utilizable as cocatalysts herein, mention may be made of pyridine N-oxide, dimethyldodecenylamine N-oxide, trimethylamine N-oxide.

Aminophenols which may be utilized in this invention include: dimethyl amino methyl phenol, tris(-dimethyl amino methyl) phenol.

Trihydrocarbon phosphines and trihydrocarbon phosphine oxides suitable for use as a cocatalyst include:

tri n-butylphosphine, trioctylphosphine oxide, triphenyl phosphine oxide, tri beta chloroethyl phosphine, triphenyl phosphine, tri-butyl phosphine oxide, Typical tertiary amine cocatalysts include N,N.-dimethylbenzylamine, N,N-diethylbenzylamine, triethylamine, N,N-dimethylaniline, N-methylmorpholine, N-ethylmorpholine, imidazole and tetrachloromethyl ethylene amine, tetramethyl guanidine, triisopropylamine, pyridine, piperazine, triethylamine, tributylamine, dimethyl benzylamine, triphenyl amine, tricyclohexylamine, quinoline, triethylamines, triphenylamine, tri (2,3-dimethyl cyclohexyl) amine.

As members of the phenol family of compounds which enhance the reaction rate as reaction promoters, mention may be made of phenol, (the compound), cresol, resorcinol, catechol, carvacrol, phloroglucinol, dimethyl phenol and naphthol. It is to be seen that several of the cocatalytic moieties can be present on one molecule and that a molecule combining the phenol moiety and a cocatlytic moiety can also be combined as for example in the aminophenol; examples of which have been previously mentioned.

While only low molecular weight monofunctional alcohols and monofunctional acids are mentioned as reactive promoters, it is seen that it is the presence of the —OH or —COOH group which acts to review the anhydride ring. The reactive promoters are deemed such, since unlike ordinary catalysts they participate in the reaction, yet are present only in small quantities, thus bifunctional and higher functional acids and alcohols which usually are added in reasonable amounts will act to sever the anhydride ring as well. However these latter unlike our defined reactive promoters, will not only measurably affect the reaction rate but also have an effect on the physical properties of the end product as well.

The cocatalyst systems of this invention should be utilized on a 0.01% to 10% level. Neither the ring opener nor the active chromium agent minimum amount should be less than about 0.015%. The reactive promoters are utilized at levels up to 30% of the weight of the cocatalyst system.

Exemplary Reactions follow

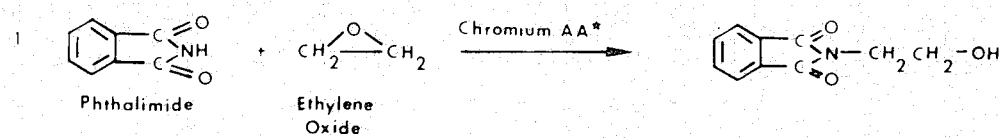

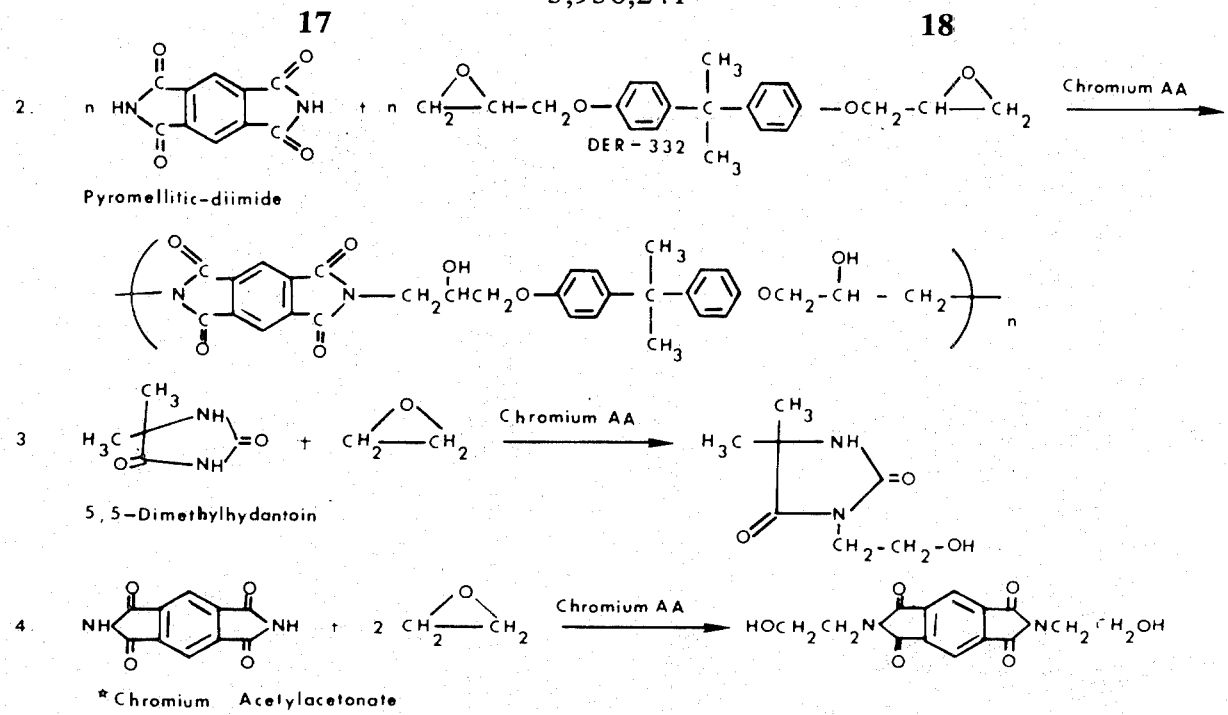

*Chromium Acetylacetonate

The polymers are prepared by forming a mixture of the oxirane compound and the acid, imide, or anhydride generally in stoichiometric amounts and containing an effective amount of the catalyst, generally from 0.1 to about 10% by weight of the reactants. The mixture is thoroughly blended at a temperature below the activation temperature, and may be stored for extended periods at ambient conditions. The mixture may be cast, molded, extruded or impregnated into or onto reinforcing materials such as cloth, roving, fibers or mats or graphite, boron, carbon, silica or the like. When heated to a temperature above the activation temperature, the mixture rapidly cures to a more rigid form.

Though solvents are preferably not present, minor amounts of below 10% by weight of the composition of inert solvents such as benzene, toluene, methylisobutyl, ketone, etc., may be present. Electron donating solvents such as methanol, ethanol, dimethyl formamide (DMF), dioxane and tetrahydrofuran (THF) should be avoided since they appear to retard catalytic activity. Specific examples of practice follow. Inert solvents do not donate electrons.

DESCRIPTION OF THE PREFERRED EMBODIMENTS

Example 1

A mixture of 172 grams (one equivalent) of Shell Epoxy Novolac 154, a reaction product of phenol formaldehyde and epichlorohydrin; 104 grams (one equivalent) of cyclopentanetetracarboxylic diimide (CPDI); and 0.828 grams (0.3%) of chromium acetylacetonate (CrAA) was thoroughly blended on a threeroll mill for a time sufficient for uniform blending to form a suspension. The resulting mixture could be stored in excess of six months without curing. At 230°C rapid cure occurred to yield a clear, rigid polyimide. Without CrAA, the resin mixture exhibited only partial cure leaving solid, unreacted, suspended CPDI. The CrAA cured resin exhibited a heat distortion temperature of 158°C (264 psi).

A six-ply glass laminate was prepared by a vacuum bag molding technique using glass cloth and the three-component mixture from above. The laminate showed the following properties, Table 2. The cured cloth was impregnated with the composition and superposed layer on layer and cured for 16 hours at 250°C.

Table 2

| From a large sheet sample | Laminate from Epoxy Resin 154/CPDI/CrAA | | |
|---|---|---|---|
| | Test Temp. °F | Flexural Strength 10³ psi | Flexural Modulus 10⁶ psi |
| 1 | 77 | 41.95 | 2.16 |
| 2 | 300 | 32.42 | 1.66 |
| 3 | 350 | 15.12 | 0.80 |
| 4 | 450 | 6.69 | 0.57 |

EXAMPLE 2

A mixture of 172 grams (one equivalent) of Shell Epoxy Novolac 154; 204 grams (one equivalent) of Shell Epon 1031, a reaction product of epichlorohydrin with p, p', p'',p'''-tetrahydroxyphenylethylene; 208 grams (two equivalents) of CPDI; and 1.75 grams (0.3%) of CrAA was thoroughly blended on a threeroll mill. The mixture was stable for greater than six months at room temperature. A sample of the liquid composition was cast in a mold and cured at 230°C for one hour. The material showed a heat distortion temperature of 172°C, i.e., the cured material maintains a rigid form up to this temperature. The testing was done according to ASTM Procedure NO. D-648.

EXAMPLE 3

A mixture of 408 grams (two equivalents) of Shell Epon 1031; 208 grams (two equivalents) of CPDI; 50 grams of methylisobutyl ketone (MIBK); and 1.85 grams (0.3%) of CrAA was blended on a three-roll mill. Sufficient glass cloth to prepare a six-ply laminate was impregnated with the milled mix and placed in a 135°F oven overnight to remove the MIBK solvent. The sample was then cured two hours at 230°C and 100 psi. The laminate exhibited the following properties.

Table 3

| | Laminate from Epon 1031/CPDI/CrAA | |
|---|---|---|
| Laminate | Flexural Strength $10^3$ psi | Flexural Modulus $10^6$ psi |
| 77°F | 44.97 | 2.47 |
| 500°F | 2.69 | 0.27 |

EXAMPLE 4

A mixture of 172 grams (one equivalent) of Shell Epoxy Novolac 154; 204 grams (one equivalent) of Shell Epon 1031; 320 grams (two equivalents) of benzophenonetetracarboxylic diimide (BTDI); and 2.09 grams (0.3% of CrAA was blended on a three-roll mill. The resin blend was stored for six months prior to laminate preparation. Fabrics made of carbon fiber and Dacron fiber, aluminum honeycomb, etc., can be laminated or adhered with these compounds. A six-ply laminate was prepared in the usual manner and cured two hours at 230°C and 100 psi. The same results would be obtained via bag mold cure at an atmospheric pressure of 15 psi. The following properties were obtained, Table 4.

Table 4

| Laminate | Flexural Strength $10^3$ psi | Flexural Modulus $10^6$ psi |
|---|---|---|
| 77°F | 36.44 | 2.06 |
| 500°F | 2.97 | 0.33 |

EXAMPLE 5

A mixture of 172 grams (one equivalent) of Shell Epoxy Novolac 154; 108 grams (one equivalent) of pyromellitic diimide (PMDI); and 0.940 grams (0.3%) of CrAA was thoroughly blended on a three-roll mill. After storing the mixture for six months at room temperature, a six-ply laminate was prepared in the usual manner and cured one hour at 250°C and 100 psi. After post-curing the laminate for 12 hours at 270°C in an oven, the properties summarized in Table 5 were obtained.

Table 5

| | Laminate from Epon 154/PMDI/CrAA | |
|---|---|---|
| Laminate | Flexural Strength $10^3$ psi | Flexural Modulus $10^6$ psi |
| 77°F | 59.48 | 3.05 |
| 400°F | 28.80 | 2.00 |
| 450°F | 20.93 | 1.89 |
| 500°F | 12.25 | 1.46 |
| 600°F | 7.98 | 1.25 |

EXAMPLE 6

This example was designed to compare the uncatalyzed reactivity of a diepoxide, DER-332 (diglycidyl ether of bisphenol (A), and a mono-imide (succinimide) with the same system catalyzed with 0.25 weight percent CrAA. Two equivalents of the diepoxide were used with one equivalent of the mono-imide (1/1 molar ratio) to insure complete usage of the imide in each case to get relative rates and to establish the stoichiometries of the reaction.

The reactions were run at a constant temperature of 175°C. The disappearance of epoxide functionality was followed by a standard perchloric acid titration method. The disappearance of the imide functionality was followed by titration with NaOH solution using a continuous recording pH titrimeter.

Table 6

| Time, Hrs. | % Unreacted Material | | | |
|---|---|---|---|---|
| | Catalyzed | | Uncatalyzed | |
| | Imide | Epoxide | Imide | Epoxide |
| 0 | 100.0 | 100.0 | 100.0 | 100.0 |
| 0.5 | 90.1 | 94.7 | 92.5 | 94.5 |
| 1.0 | 62.4 | 71.9 | 83.6 | 88.7 |
| 1.5 | 18.0 | 53.2 | 65.2 | 81.3 |
| 2.0 | 0.2 | 45.2 | 54.2 | 73.3 |
| 2.5 | 0 | 42.9 | 37.3 | 65.5 |
| 3.0 | 0 | 41.2 | 24.8 | 57.8 |
| 3.5 | 0 | 40.2 | 14.3 | 53.1 |
| 4.0 | 0 | 39.8 | 4.0 | 47.9 |
| 4.5 | 0 | 38.8 | 0 | 45.8 |
| 5.0 | 0 | 38.2 | 0 | 45.0 |

As can be seen from the above, with only 0.25% catalyst the reaction progresses about 2½ times as rapidly as does the uncatalyzed reaction. The results indicate that the required stoichiometry for complete imide reaction is approximately 1.1 epoxide to 1.0 imide for both the catalyzed and uncatalyzed reaction. The discrepancy arises from an uncatalyzed epoxide side reaction.

The following table shows the actual rate of reaction for the 0.25% CrAA catalyzed imide/epoxy reaction at 150°C in which the reactants are formulated in a 1:1 equivalency stoichiometry. The methods used are the same as those used in Example 5.

Table 7

| Time, Hrs. | % Unreacted Material | |
|---|---|---|
| | Imide | Epoxide |
| 0 | 100.0 | 100.0 |
| 1 | 85.0 | 84.0 |
| 2 | 63.0 | 61.0 |
| 3 | 44.0 | 41.0 |
| 4 | 34.0 | 30.0 |
| 5 | 27.0 | 20.0 |
| 6 | 22.0 | 15.0 |
| 7 | 20.0 | 12.0 |
| 8 | 18.0 | 10.0 |
| 9 | 17.0 | 9.0 |
| 10 | 16.0 | 8.0 |

EXAMPLE 7

Ten grams of a stoichiometric mixture of Emery Dimer Acid (a $C_{36}$ diacid having an equivalent weight of 1600) and Reichold Triepoxide 427–61 (a reaction product of epichlorohydrin and trimethylol propane having an equivalent weight of 160) were combined with a solution of 0.2 grams of chromium acetylacetonate (CrAA) in 10 ml of toluene. The resulting solution was stable for greater than six months showing no increase in viscosity. A thin film of the resin mixture cured to a rubbery solid in three minutes at 180°C. In the absence of CrAA, the mixture did not gel after 15 minutes at 180°C.

EXAMPLE 8

Ten grams of the above acid-epoxy mixture were combined with 0.2 grams of chromium cyclohexanoneacetonate (CrCA). No change in viscosity of the mixture occurred in six weeks at ambient temperatures. At 150°C, however, the resin cured to rubbery solid in 15 minutes.

An improved method for synthesis of the latent catalysts is illustrated below:

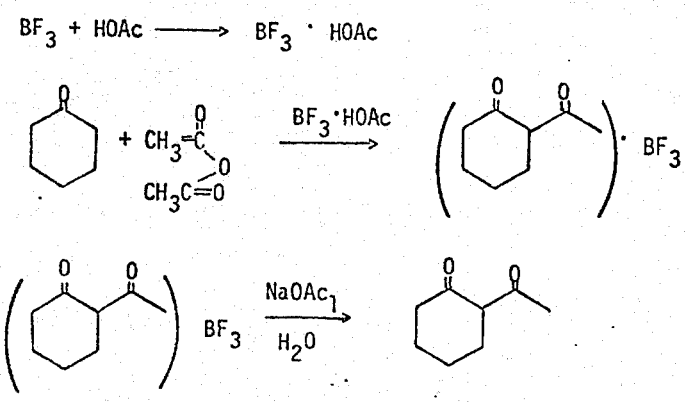

The above method is taken from the procedure of C. R. Houser, et al, JACS, 75 5030 (1953). The procedure involves saturating glacial acetic acid with boron trifluoride gas until a solid complex is formed. To the complex is added a mixture of cyclohexanone and acetic anhydride. After reaction is complete, the mixture is hydrolyzed in an aqueous solution of sodium acetate. The organic material is extracted with petroleum ether and the extract washed with bicarbonate and water. Distillation affords an 80% yield of water white product.

EXAMPLE 9

A preparation of Tris-(2-acetylcyclohexanonato)-Chromium III is illustrated in the example below:

$$CrCl_3 \cdot 6H_2O + $$ 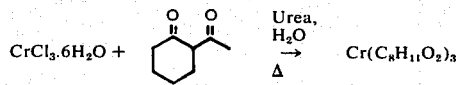 $$\xrightarrow[\Delta]{\text{Urea, } H_2O} Cr(C_8H_{11}O_2)_3$$

The chelate was prepared in pure form and in reasonable yields by reacting chromium chloride hexahydrate with at least a 50% excess of 2-acetylcyclohexanone in an aqueous solution of urea. Excess diketone was removed by distillation or extraction with 5 to 10% sodium hydroxide. The following table summarizes the results of three runs:

EXAMPLE 10

A preparation of Tris-(1,3-Diphenyl-1,3-Propane-Dionato/ Chromium III is described below:

To a three-neck round bottom flask equipped with a condenser, thermometer and magnetic stirring bar were added 9.0g (0.04 mol) of dibenzoylmethane, 3.5g (0.0135 mol) of Chromium (III) chloride hexahydrate, 2.5g of urea and 200 ml of 96% DMF. The mixture was heated and stirred at 105°–110°C for 24 hours. The solution was allowed to cool to room temperature and then was poured into 400 ml of an ice-water mixture. The aqueous solution was filtered to give 9.25g (95%) of crude red-brown product. Recrystallization from benzene-hexane gave a first crop of red-brown crystals weighing 4.76g, m.p. >305°C (lit., 317°–318°C). The infrared spectrum of the compound exhibits an internal doublet at 1520–1535 cm$^{-1}$.

EXAMPLE 11

A preparation of Tris-(1-Phenyl-1,3-Butanedionato) Chromium (III) is described below:

The same procedure as in Example 10 was followed. The yield of recrystallized product (green solid) was 8.5g (69.9%) m.p. 233°–237°C (lit., 236°–238°C). The infrared spectrum exhibited bands at 1545 and 1510 cm$^{-1}$ characteristic of chelated carbonyls.

A particularly interesting latent chromium III catalyst prepared is the tris picolinate salt. Due to steric effects the pyridine amine is able to weakly complex with the available coordination sites of the Chromiun III thereby Table 8

| Run No. | Moles CrCl$_3$.6H$_2$O | Moles 2-A-C* | % Yield, Chelate | % C | Found % H | % Cr | % C | Theory % H | % Cr |
|---|---|---|---|---|---|---|---|---|---|
| 1 | 0.02 | 0.068 | 45.3 | 61.26 | 6.96 | 11.08 | | | |
| 2 | 0.02 | 0.090 | 98.1 | 61.08 | 7.36 | 10.68 | 61.39 | 7.08 | 11.0 |
| 3 | 0.02 | 0.120 | 94.9 | 61.25 | 7.30 | 10.79 | | | |

*2-acetyl cyclohexanone

Two chelates were prepared following the procedure of J. P. Collman, et al, JACS, 83 531 (1961). The physical data and IR spectra of the chelates agree with literature reports. The experimental procedure for the preparation of each is described below.

rendering it inactive at room temperature.

The Chromium III tris picolinate was prepared by an interchange reaction with a triacetate via the procedure utilized for preparation of tris-2-acetylcyclohexanoate.

The Cr picolinate salt was evaluated as a cure catalyst for powder coatings and the following data obtained.

Table 9

Gel-Times* for Powder Coating Compositions:

| Material | Wt. % | Catalyst | Temp. | Gel-Time |
|---|---|---|---|---|
| Epon 1004 (epichlorohydrin-Bis-phenol A resin) | 87.8% | Chromium (III) | 104°C | 15 min. |
| TMA (trimethyl amine) | 11.0% | Picolinoate | 158°C | 2 min. |
| Catalyst | 1.2% | No Catalyst | 104°C | <<15 min. |
|  |  | No Catalyst | 158°C | 6 min. |

*Determined on a heated platen. The gel-time corresponded to the time when the sample no longer would stick to a spatula.

The above composition when cured at 175°C gels very rapidly, <1 min but resulted in opaque and voidy solids. Further investigation revealed that the picolinoate was decarboxylating, the generated $CO_2$ resulting in void formation.

Cr tris (acetylcyclohexanoate) was formulated with phenol and benzyl dimethyl amide (BDMA) and with phenol and hexamethyl phosphoramide (HMPA) to provide a "latent" ter catalyst system for epoxy-anhydride reactions. These catalyst mixtures were added to a DER-332 (diglycidyl ether of 2,2-(p-hydroxyphenyl propane)/ Lindride 4 (methyl terephthalic anhydride) mixture at a 1% level and the gel-times at various temperatures measured as shown below.

Table 10

| Catalyst | Temperature, °C | Gel-Time, mins. |
|---|---|---|
| CrAC-Phenol-BDMA (1:1:1 molar ratio) | Room | Did not gel in two weeks |
|  | 50° | 2325 |
|  | 100° | 30 |
|  | 125° | 8.4 |
| CrAC-Phenol-BDMA (1.1:1:1) molar ratio | Room | Did not gel in two weeks |
|  | 50° | 3099 |
|  | 100° | 13.4 |
|  | 125° | 1.8 second |
| CrAC-Phenol-HMPA (1:1:1 molar ratio) | 100° | 291 |
|  | 125° | 79.5 |
|  | Room | Did not gel in two weeks |

As is evident, the tercatalyst provides the synergistic behavior when the chelate is used above its dissociation (latency) temperature. Surprising is the effect of minor variation of the cocatalyst molar ratio on gel time, as evidenced by the reduction in gel time at 125°C from 8.4 minutes to 1.8 seconds.

Even though gel did not occur at room temperature, there was an obvious increase in the resin viscosity. Whereas CrAC will not promote anhydride/epoxy reaction at room temperature, the change must be attributed to the 3° amine and/or phenol present.

Catalyst combinations of CrAC/TMG were made up in a weight ratio of CrAC/TMG of 1:2, 1:1 and 2:1. Each catalyst combination was checked at the 1% level in the Lindride 4/DER-332 system containing 52.1% DER 322, 46.9% Lindride 4 and 1% catalyst by weight. The data is presented below.

Table 11

Gel Times of CrAC/TMG Catalysts in the Lindride 4/DER-332 System at 100°C

| Catalyst | Gel-Time (mins.) |
|---|---|
| CrAC/TMG, 1:2 | 254.4 |
| CrAC/TMG, 1:1 | 6.5 |
| CrAC/TMG, 2:1 | 5.0 |
| TMG | 562.2 |
| CrAC | 260.0 |

As can be seen by the data, the reaction is extremely slow at 100°C for TMG, i.e., tetramethylguanidine alone as the catalyst. At this temperature benzyldimethylamine gives a gel-time of ca. 10 min. in this system at the 1% level. This data suggest that TMG should provide improved room temperature latency when used with CrAC.

Kinetics were run to measure tthe catalytic activity of CrAC, CrAA, tris (1-phenyl-1,3-butanedionate) Chromium (III) and chromium octoate a 54°C. As can be seen in the following table, the chelates exhibit no activity at this temperature whereas the half life of COT is 420 minutes and 40 minutes at room temperature and 54°C, respectively.

Table 12

COMPARISON OF THE CATALYTIC ACTIVITY OF VARIOUS CHELATES AND CHROMIUM OCTOATE IN THE REACTION OF PHENYL GLYCIDYL ETHER AND SUCCINIMIDE AT 54°C*

| Catalyst | Time (hr) | % Epoxy Remaining | % Imide Remaining |
|---|---|---|---|
| Chromium Octoate | 0 | 100 | 100 |
|  | 0.25 | 88.1 | — |
|  | 0.27 | — | 90.1 |
|  | 0.49 | 67.1 | — |
|  | 0.51 | — | 79.6 |
|  | 0.71 | 52.4 | — |
|  | 0.73 | — | 70.4 |
|  | 1.00 | 40.6 | — |
|  | 1.01 | — | 57.9 |
|  | 1.29 | 33.6 | — |
|  | 1.31 | — | 53.9 |
|  | 1.92 | 23.8 | — |
|  | 1.95 | — | 46.7 |
|  | 2.76 | 17.5 | — |
|  | 2.77 | — | 39.5 |
|  | 4.94 | 9.8 | — |
|  | 4.95 | — | 26.3 |
| CrAC | 0 | 100 | 100 |
|  | 1.78 | 100 | 100 |
|  | 23.25 | 98.6 | 100 |
|  | 118.33 | 99.3 | 100 |
| CrAA | 0 | 100 | 100 |
|  | 2.14 | 99.3 | 100 |
|  | 23.48 | 99.3 | 100 |
|  | 118.23 | 98.6 | 100 |
| Tris-(1-phenyl-1,3-butanedionato)-Chromium (III) | 0 | 100 | 100 |
|  | 89.50 | 99.1 | 100 |
|  | 130.83 | 99.5 | 100 |
| Uncatalyzed | 0 | 100 | 100 |
|  | 2.25 | 100 | 100 |
|  | 22.63 | 100 | 100 |
|  | 117.35 | 100 | 100 |

*Solvent was 50:50 acetonitrile-toluene. Catalyst level was 1% based on the tota volume.

Further kinetic studies of the room temperature activity of CrAA, CrAC and COT were conducted. The catalysts were studied by following the disappearance of epoxide, by titration. Mono functional reactants were selected; succinic anhydride and phenyl glycidyl ether. The two chelates are essentially inactive catalysts at room temperature while COT shows a t ½ of ≈ 7 hours. The data presented in the following table should provide ample proof to the latency claims for these chelates.

Table 13

Comparison of the Catalytic Activity of CrAA, CrAC and Chromium Octoate in the Reaction of Phenylglycidyl Ether and Succinic Anhydride

| Catalyst | Time (hr) | Epoxy Remaining (cq/l) | Imide Remaining (cq/l) |
|---|---|---|---|
| CrAA | 0 | 0.142 | 0.154 |
| | 16.57 | 0.138 | 0.153 |
| | 65.67 | 0.140 | 0.153 |
| CrAC | 0 | 0.142 | 0.154 |
| | 20.87 | 0.139 | 0.148 |
| | 45.67 | 0.140 | 0.153 |
| Chromium Octoate | 0 | 0.142 | 0.154 |
| | 0.16 | | 0.157 |
| | 0.18 | 0.143 | — |
| | 0.46 | | 0.157 |
| | 0.49 | 0.142 | |
| | 1.14 | | 0.154 |
| | 1.17 | 0.133 | |
| | 2.22 | | 0.133 |
| | 2.24 | 0.115 | |
| | 3.17 | | 0.120 |
| | 3.21 | 0.100 | |
| | 4.26 | | 0.112 |
| | 4.31 | 0.087 | |
| | 5.26 | | 0.108 |
| | 5.30 | 0.078 | |
| | 20.37 | 0.037 | 0.052 |
| Control (No catalyst) | 0 | 0.142 | 0.154 |
| | 21.33 | 0.142 | 0.151 |
| | 46.50 | 0.141 | 0.149 |

Preliminary evaluation in the resin systems of tris(1-phenyl-1,3-butane dionato) chromium III and tris-(1,3 diphenyl1,3-pentane dionato) chromium III show these chelates to be significantly slower than tris-(2-acetyl cyclohexane dionato) chromium III at 100°C. These phenyl substituted chelates did not provide true solutions in the anhydride or anhydride epoxy system. Further studies are necessary to establish whether this decreased activity is the result of the chelate dissociation temperature or solubility. The tris (phenyl butanedionato) $Cr^{III}$ has been examined and at 100°C a t ½ of ≈80 minutes is found.

Tetramethyl guanidine $[(CH_3)_2NC(NH)N(CH_3)_2]$ was evaluated and found to be very slow as the sole catalyst at 100°C but provides true synergism as a cocatalyst with CrAc.

EXAMPLE 12

Example 12

| | DER-332 Lindride 4 1% Catalyst |
|---|---|
| TMG | 562 minutes |
| CrAC | 260 minutes |
| TMG/CrAC | 5 minutes |

Benzene Sulfonimide reacts with Butylene Oxide according to the following formula:

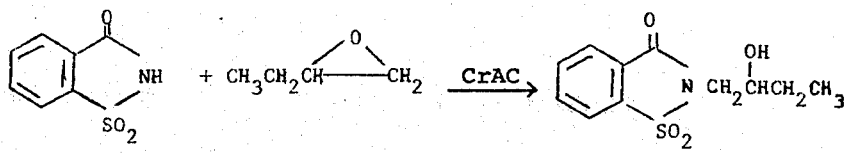

EXAMPLE 13

To a 100 ml round bottom flask was added 9.15 grams (0.05 mole) of benzene sulfonimide, 4.0 grams (0.055 mole) of 1,2-butylene oxide, 0.30 grams of CrAC and 50 ml of methylisobutyl ketone (MIBK). After one hour at 100°C the reaction was complete. The solvent was removed under vacuum, the oil dissolved in 200 ml of water and treated with charcoal to remove chromium. The white solid product crystallized and after drying for 16 hours under vacuum showed a strong OH bond and the absence of imide NH on the infrared spectrum.

EXAMPLE 14

An identical run without chromium did not react and the benzene sulfonimide was recovered.

Benzene Sulfonimide reacts with Cyclohexane Oxide according to the following formula:

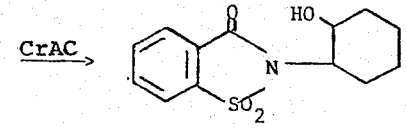

EXAMPLE 15

To a 100 ml round bottom flask was added 9.15 grams (0.05 moles) of benzene sulfonimide, 5.40 grams (0.055 mole) of cyclohexene oxide, 0.30 grams of CrAC and 50 ml of MIBK. The reaction was complete after 3 hours at 100°C. The solvent removed residue was treated with ether to provide the white solid product. After crystallization from hexane-ether the hydroxycyclohexyl benzene sulfonimide melted at 173°–173.5°C.

Anal: Calcd for $C_{13}H_{15}O_4NS$ C-55.5 H-5.33 N-4.98 S-11.4 Found C-55.22 H-5.24 N-5.20 S-11.61

The infrared spectrum was consistent with the proposed compound structure.

EXAMPLE 16

In the absence of chromium no reaction occurred and the benzene sulfonimide was recovered.

The polymers prepared in accordance with this invention are useful in films for wire and cable wrap, motor insulation, surface coatings, lacquers, textile fibers, adhesives, molding resins, fiber glass laminates for use in radomes, aircraft leading edge structures, nose fairings, high temperature deicer ducts, and turbine compressor blades, honeycombs, bearings for use with nonlubricating liquids, with corrosive substances at elevated temperatures, in areas where lubrication is essential but inconvenient, and as retainer rings for ball bearings, electrical conductive films, when coated with tin and indium, and temperature resistant foams.

It is to be realized that only preferred embodiments of the invention have been described and that numerous substitutions, alterations and modifications may be made without departing from the spirit and scope of the invention as defined in the following claims.

What is claimed is:

1. A method of reacting a polymerizable organic compound selected from carboxylic acids, anhydrides, imides and sulfonimides with an oxirane oxygen compound which comprises forming a mobile mixture of said compounds containing a catalytically effective amount of a chromium III chelate having a dissociation temperature above about 50°C and subsequently heating said mixture to above said temperature to react said compounds.

2. A method according to claim 1 in which the dissociation temperature is from 50°C to 250°C and in which the chelate ligand is selected from compounds of the formula:

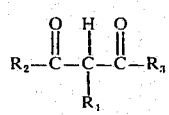

where $R_1$ is selected from (a) hydrogen, alkyl, aryl, cycloalkyl, and (b) hydroxy, halo, nitro and cyano derivatives of (a), $R_2$ and $R_3$ are selected from $R^1$, halo, $NR^1$ and $OR^1$ and $R_2$ and $R_1$ taken together form a saturated or unsaturated hydrocarbon chain containing no more than 10 carbon atoms.

3. A method according to claim 2 in which the oxirane compound is selected from 1,2-epoxy alkanes, epoxy cyclo-alkanes and polyepoxide compounds containing a plurality of reactive 1,2-epoxy groups.

4. A method according to claim 3 in which the polymerizable compound is di- or polyfunctional.

5. A method according to claim 3 in which the imide is selected from the group consisting of succinimide, phthalimide, tetrahydrophthalimide, hexahydrophthalimide, maleimide, glutarimide, barbituric acid, cyclopentane diimide, pyromellitic diimide, benzophenonediimide, diphenylether diimide, adipimide, terephthal-diimide, benzene sulfonimide, hydantoins, amidimides and imide terminated resins.

6. A method according to claim 5 in which the mixture comprises a mobile mixture of a diimide and a polyepoxide epoxy resin and said reaction results in a cured polyimide.

7. A method according to claim 6 in which the chelate is tris-(2-acetylcyclohexanato)-Chromium (III).

* * * * *

UNITED STATES PATENT AND TRADEMARK OFFICE
CERTIFICATE OF CORRECTION

PATENT NO. : 3,956,241

DATED : May 11, 1976

INVENTOR(S) : Roger B. Steele, Arthur Katzakian, Jr., Herman H. Weyland

It is certified that error appears in the above-identified patent and that said Letters Patent are hereby corrected as shown below:

Column 2, line 60, second occurrence change "are" to --and--;

Column 3, in the first line after the second formula, after "epoxy" add --)--;

in the first line after the third formula, change ".2" to --1,2--; and correct "Hexahydromethano"

In the second line after the third formula correct "indanoxyl]ethane";

Column 12, line 1, change "of" to --or--.

Signed and Sealed this

Seventh Day of September 1976

[SEAL]

Attest:

RUTH C. MASON
*Attesting Officer*

C. MARSHALL DANN
*Commissioner of Patents and Trademarks*